United States Patent Office 3,391,942
Patented July 9, 1968

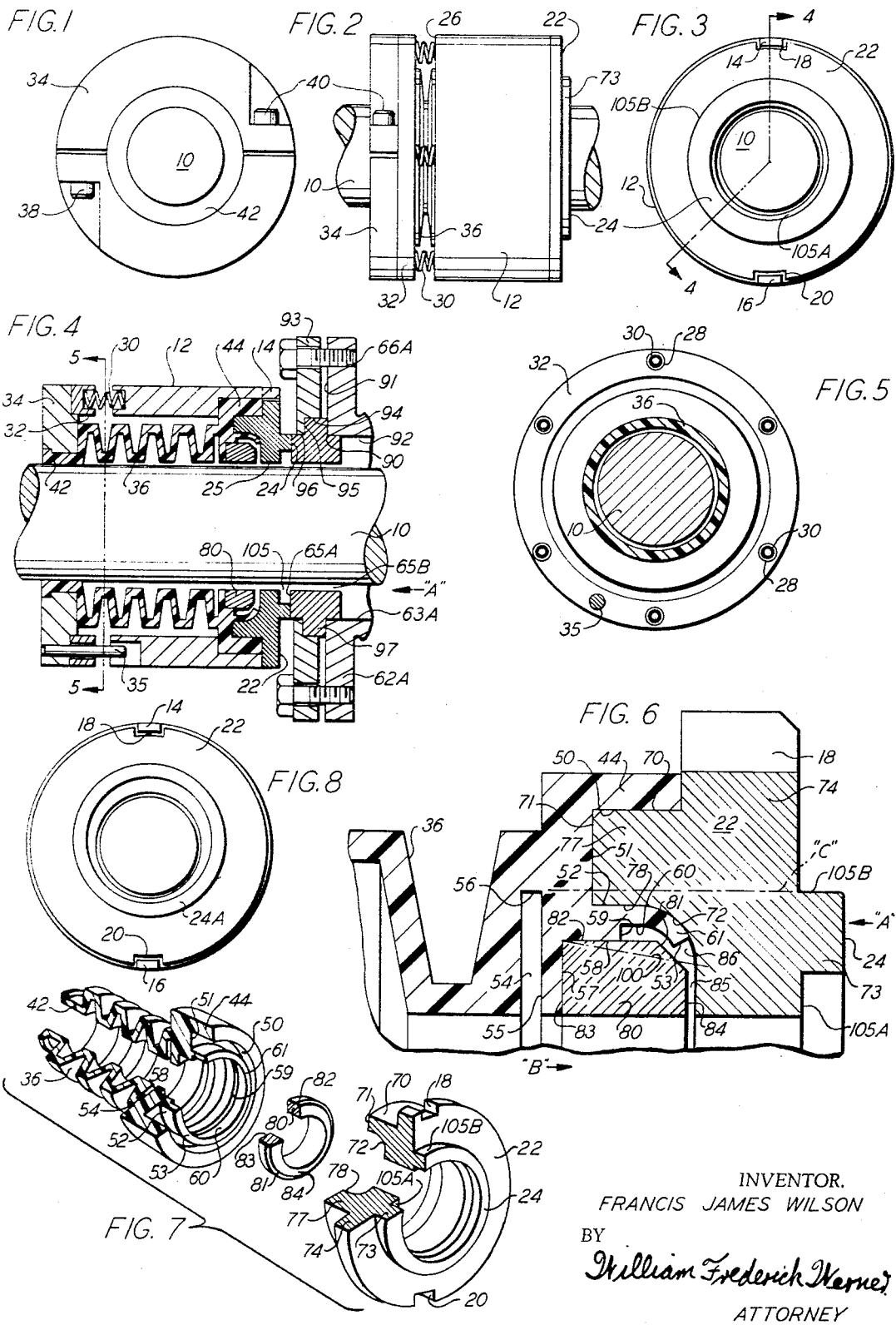

3,391,942
ROTARY MECHANICAL FLUID SEAL
Francis James Wilson, Cranston, R.I., assignor to Sealol, Inc., Warwick, R.I., a corporation of Delaware
Continuation-in-part of application Ser. No. 454,973, June 18, 1965. This application Sept. 17, 1965, Ser. No. 488,035
9 Claims. (Cl. 277—89)

ABSTRACT OF THE DISCLOSURE

A rotary mechanical fluid seal comprising a flexible bellows having a cage provided with a circular groove and a resilient deformable lip, a rotary sealing ring having an annular mating face and a tongue with a tapered surface, said tongue engaging said circular groove and said resilient deformable lip yieldingly engaging said tapered surface, to removably secure said rotary sealing ring in said cage by means of a snap-in and snap-out mechanical action.

---

The present invention is a continuation-in-part of United States Ser. No. 464,973, filed June 18, 1965 for a Rotary Mechanical Fluid Seal.

The present invention is concerned with rotary mechanical fluid seals of the type used for effecting a fluid tight seal between a rotating sealing ring and a stationary sealing face, and more particularly with a ring like mating face which is resiliently pressed in an axial direction against a radially extending stationary face.

An object of the present invention is to provide the rotating member of a rotary mechanical fluid seal with a replaceable circular mating face without disassembling the entire rotary mechanical fluid seal.

Another object of the present invention is to provide the rotary sealing element of a rotary mechanical fluid seal with novel structural features, whereby any one of a plurality of mating faces may be snapped into and snapped out of said rotary sealing element.

Still another object of the present invention is to provide a rotary mechanical fluid seal which will function satisfactorily in a corrosive fluid environment.

A further object of the present invention is to utilize the fluid pressure as a force to assist the various elements in effecting fluid tight seals, vis, the deformed lip, and the mating face.

And still another object of the present invention is to axially off-set the forwardly protruding annular mating face whereby, a wiping action is initiated with the stationary sealing face to provide a clean surface couple.

Other objects of the present invention will be pointed out in part and become apparent in part in the following specification and claims.

Like reference numerals refer to like parts in the accompanying drawings in which:

FIGURE 1 is an elevational view of one end of the fluid seal of the present invention.

FIGURE 2 is a side elevational view of the fluid seal of FIGURE 1.

FIGURE 3 is a view similar to FIGURE 1, viewing the opposite end of the fluid seal from that of FIGURE 1.

FIGURE 4 is a sectional view, taken generally along lines 4—4 of FIGURE 3, of the fluid seal of the present invention, shown arranged on a shaft to perform under conditions of internal fluid pressure.

FIGURE 5 is a sectional view taken along lines 5—5 of FIGURE 4.

FIGURE 6 is an enlarged fragmentary cross sectional view showing the rotary sealing ring and the restraining ring housed in the cage section of the bellows.

FIGURE 7 is an exploded perspective view of the bellows, restraining ring and rotary sealing ring.

FIGURE 8 is a view similar to FIGURE 3 illustrating a modified form of construction of the forwardly protruding annular mating face; namely, the mating face is axially offset or excentric to the shaft.

In proceeding with this invention reference is directed to the drawing, wherein is illustrated the present rotary mechanical fluid seal supported upon a rotatable shaft 10.

The seal includes a cylindrical outer housing 12 having a pair of diametrically disposed keys 14 and 16 which protrude forwardly from one margin thereof. Keys 14 and 16 suitably engage diametrical slots 18 and 20 of a rotary sealing ring 22. Sealing ring 22 has a forwardly protruding annular mating face 24, axially concentric, as seen in FIGURES 3 and 4. Further, sealing ring 22 may be constructed of any suitable material such as carbon, rubber, plastic or like material applied customarily in the sealing art for sealing ring purposes. By virtue of the arrangement of the keys 14, 16 interlocking in the respective grooves 18, 20 it will be appreciated that housing 12 which receives shaft 10 through the center thereof, in its normal application, and sealing ring 22 which is axially bored through at 25 to loosely receive the shaft 10 therethrough, are adapted to rotate with the shaft as an integral unit.

The end of housing 12 remote from the end thereof accommodating sealing ring 22, terminates in a right-angular wall 26 (FIGURES 2 and 4) which has a plurality of equidistantly spaced blind holes therein at 28 (see FIGURE 5), each of which said holes receives a compression spring 30 therein. The outer end of each spring 30 protrudes outwardly beyond the confines of its respective hole. As best seen in FIGURE 4 the outer end of each spring is positioned to bear on an annular thrust ring 32 securely attached to a clamp ring 34. In order that the outer ends of the springs 30 may be suitably contained against thrust ring 32, this thrust ring is provided with a plurality of blind holes corresponding in number to the like holes in housing 12. Obviously, the holes of thrust ring 32 and housing 12 would be situated in alignment in order that each of the several springs would extend between the thrust ring and housing without linear distortion. Moreover, it will be appreciated that the spacing of clamp ring 34 with respect to housing 12 may be adjusted axially of shaft 10 to sufficiently compress each of the springs so that the springs would exert a force on the movable housing 12.

It is, of course, desirable, that housing 12, together with thrust ring 32 and clamp ring 34, rotate on shaft 12 as an integral unit without developing a torque in bellows 36. To this end a pin 35 is employed. Pin 35 is embedded in thrust ring 32 and projects forwardly into a blind hole in housing 12. The depth of the hole in housing 12 is, of course, sufficiently deep to allow the pin to slide axially thereof as springs 30 are flexed without restricting the movement of the springs.

As will be evident viewing FIGURE 4, a bellows 36 is enclosed generally with housing 12. Bellows 36 is constructed of a fluid impervious, corrosive resistent plastic, preferably tetrafluoroethylene, formed so as to have characteristics for axially shifting within housing 12 to compensate for shaft runout and to adjust for mating face 24 wear. By virtue of its construction of tetrafluoroethylene bellows 36 is chemically inert and has exceptional retention of its mechanical properties under varying temperature conditions.

It will be seen from FIGURE 1 that clamp ring 34 is split into two sections which are connected together on shaft 10 by a pair of cap screws 38 and 40. Advantageously, this permits one end of the bellows, which is formed as a sleeve 42 (see FIGURE 4), to be clamped tightly about shaft 10 for rotation therewith. Due to the fact that bellows 36 is constructed of tetrafluoroethylene, as previously stated, sleeve 42 readily conforms to the shape of the outer circumference of the shaft 10. This results from the fact that tetrafluoroethylene has the property of being highly orientable, thus permitting its molding under clamping pressure around the shaft 10. By virtue of the sleeve 42 of bellows 36 being secured to shaft 10 for rotation therewith it will be seen that as the shaft 10 is rotated the fluid seal constituted as rotary sealing ring 22, annular thrust ring 32, clamp ring 34, together with cooperative springs 30 and the bellows 36 will also be rotated.

It is appropriate at this time to point out, that due to the fact that sleeve 42 is provided with a clamping means in the form of clamp ring 34 for insuring sealing engagement of the sleeve with shaft 10, this sleeve 42 does not have to be machined to precise tolerances found so necessary when metal parts are used for the sleeve. Rather, because of the plastic nature of the sleeve 42, this sleeve may vary slightly in size from the circumference of shaft 10 and yet a fluid tight seal may still be readily established between these two parts. Thus, should the diameter of the aperture through sleeve 42 be slightly oversize with respect to the circumference of shaft 10, the clamp ring will be effective to seal the sleeve to shaft 10. If the sleeve aperture is slightly undersize the sleeve may be press fitted onto the shaft and the clamp ring 34 employed to retain the ring sealingly onto the shaft. In either event, it will be understood that sleeve 42 is sealed onto shaft 10 in a fashion to prevent the passage of fluid between these two parts.

With reference to FIGURES 4, 6 and 7, it will be observed that the terminus of bellows 36 at the opposite end thereof from sleeve 42 is formed as a circular cage 44 having a U shaped circular groove identified as upper surface 50, back wall 51, lower surface 52 which terminates in lip surface 53.

Cage 44 is also provided with an open ended pressure chamber 54 having a forward wall 55 and a bottom 56. Cage 44 is further provided with a pair of steps consisting, respectively, of a first vertical wall 57, a first horizontal wall 58, a second vertical wall 59 and a second horizontal wall 60. Lip surface 53, second vertical wall 59 and second horizontal wall 60, provide a resilient projection or resilient deformable lip 61.

The rotary sealing ring 22 is provided with a companion shape to mate with the U shaped circular groove in cage 44. To that end rotary sealing ring 22 is provided with a tongue 77 having a top 70, rear 71 and a cone type tapered surface 72. Sealing ring 22 is also provided with an annular projection 73 having an annular mating face 24 and a rim 74 provided with diametrical slots 18 and 20.

In assembling sealing ring 22 with cage 44, tongue 77 is press fitted into the U shaped circular groove with top 70 engaging upper surface 50 and with the cone type tapered surface 72 engaging resilient deformable lip 61. Lip 61 resiliently deforms to engage tapered surface 72; so that as the flat initial area 78 at the base of tapered surface 72 engages lower surface 52; lip 61 will take the shape of tapered surface 72 and exert a pressure force on tapered surface 72.

A restraining ring 80, generally rectangular in cross section is provided with a beveled edge 81. Restraining ring 80 is assembled into one of the pair of steps in cage 44 with a slip fit, so that annular surface 82 of ring 80 engages first wall 58 and surface 83 of ring 80 engages first vertical wall 57. In this manner, annular surface 82 supports first horizontal wall 58 for reasons which will presently appear. Surface 84 of ring 80 provides a passageway 85 in cooperation with the tapered surface 72. Beveled edge 81 assists in providing a chamber 86 with the second step (wall 59 and 60) in cage 44. Specifically, chamber 86 is formed by beveled edge 81, second vertical wall 59, second horizontal wall 60 and tapered surface 72. Passageway 85 is in communication with chamber 86.

In FIGURE 4, a flange 62A is provided with a concentric axial bore 63A and a corner 90 defined by surfaces 91 and 92. An annular frame member 93, provided with a concentric circular recess defined by surfaces 94 and 95 and a concentric annular bore 96, is fastened to flange 62A by means of bolts 66A. A stationary sealing ring 97 provided with a stationary sealing face 65A and a concentric axial bore 65B is provided with a companion shape so as to be held in fixed position in relation to annular mating face 24 by means of surfaces 91, 92, 94, 95 and annular bore 96 and bolts 66A. Annular mating face 24 yieldingly engages stationary sealing face 65A by means of the force exerted by coil springs 30 and the convolutions of bellows 36.

By way of example, and not by limitation, the present rotary mechanical fluid seal may be attached to the shaft of a pump which is pumping any one of the many types of acids, caustic sodas or other highly corrosive liquids. In this corrosive environment it has been found desirable to use tetrafluoroethylene as the material for the bellows 36 of which cage 44 is an integral part. However, the fluids to be sealed have a normal temperature range between 135 degrees Fahrenheit and 200 degrees Fahrenheit. In this temperature range tetrafluoroethylene possesses a very high incidence of thermal expansion. It may be restated and said that tetrafluoroethylene reacts with thermal produced energy. With reference to FIGURE 6, it will be noted that first horizontal wall 58 under the influence of thermal produced energy will sag or drop to produce a sloping surface indicated by dot and dash line 100. Obviously, lip 61 would lose some or all of the resilient force it provides against tapered surface 72. Rotary sealing ring 22 would not be securely held in cage 44. To rectify this condition applicant takes advantage of operating conditions by means of structural features in cage 44, as will presently appear, and applicant also provides a supporting structure in the form of restraining ring 80.

Restraining ring 80 preferably fabricated from tetrafluoroethylene, or from glass filled tetrafluoroethylene, supports first horizontal wall 58 so that thermal expansion of cage 44 does not cause wall 58 to sag.

Pressure chamber 54 is provided so that, with reference to FIGURE 6, the fluid flowing in the direction of arrow A under pressure from the pump impeller (not shown) will act on forward wall 55 in the direction of arrow B, to assist in overcoming the sagging of first horizontal wall 58 and to provide a force which will force flat initial area 78 and lip surface 53 against cone tapered surface 72. In this manner the fluid pressure is used to hold rotary sealing ring 22 and specifically tongue 77 in cage 44.

As previously stated a chamber 86 is provided and through passageway 85, fluid under pressure enters chamber 86, thereby to exert a force upon second horizontal wall 60, in its deformed position, FIGURE 6, thereby to force lip surface 53 against cone tapered surface 72 to further fasten rotary sealing ring 22 in cage 44.

It becomes obvious, that at the time one rotary sealing ring 22 is removed from cage 44 and another sealing ring 22 substituted the pump will not be operating and therefore whatever fluid may be found in chambers 54 or 86 will be without pressure so that the inherent resilient characteristics of the material of which cage 44 is fabricated will be the only force to be overcome in order to withdraw sealing ring 22 out of engagement with cage 44. It will be noted that as soon as sealing ring 22 is withdrawn from cage 44 deformable lip 61 will assume a straight line position (FIGURE 7) and be ready to be deformed over again by a cone tapered surface such as surface 72.

It will be observed in FIGURE 4 that sealing ring 97 has an enlarged axial bore 65B therethrough in order that shaft 10 may enter through the seal for rotation. Stationary sealing ring 97 has a protruding concentric annular stationary sealing face 65A projecting from the side of stationary sealing ring 97 and mating in fluid tight engagement with circular mating face 24. A chamber is formed at 105 between stationary sealing ring 97 and its counterpart rotary sealing ring 22. As pressurized fluid is admitted in the direction of arrow A, it flows through the clearances between shaft 10 and sealing rings 97, 22 to be received inwardly of bellows 36 where the fluid is sealed off at sleeve 42. This fluid operates on the inclined faces of the bellows 36 to once again urge the circular mating face 24 and the stationary sealing face 65A together. As previously described, springs 30 are effective to further exert a force on these sealing faces 24, 65A and the tendency of the bellows 36 to extend axially produces an additional force on the sealing faces 24, 65A. However, some counterbalancing force is produced by the pressurized fluid as it is trapped in chamber 105 to relieve the total biasing forces acting to urge the rotary sealing ring 22 toward stationary sealing face 65A. In the application of the rotary mechanical fluid seal shown in FIGURE 4, it will be noted, that as fluid flows to the couple, faces 24, 65A, in the direction indicated by arrow A, the only part of the fluid seal, save the faces 24, 65A, which is contacted by the fluid, is the inside of bellows 36. As explained previously, these bellows 36 are uniquely constructed of tetrafluoroethylene so that, even if the fluid which is flowing to the couple is corrosive, proper sealing will be insured by the protection offered by the advantageous arrangement of the various parts in the present invention. Bellows 36 is so constructed so that when fluid under pressure is introduced against the inside surface as in FIGURE 4, the bellows 36 will function without collapsing.

It is obvious that circular mating face 24 may be increased or decreased in width or located above or below the present position on rotary sealing ring 22 so that the size of chamber 105 may be varied and the area of surface 105A (see FIGURE 7), may be varied to increase or decrease the counterbalance force described previously.

It is to be noted that bottom 56 should have a position relative to edge 105B (see FIGURE 6), of circular mating face 24 as indicated by dot and dash line C. In this manner the area of forward wall 55 is controlled to vary the area upon which the pressurized fluid acts to force circular mating face 24 against stationary sealing face 65A.

It has been found advantageous in certain applications of couple 24, 65A to provide a wiping action therebetween to insure the engagement of clean mating surfaces. To that end, forwardly protruding annular mating face 24A (see FIGURE 8) is made axially eccentric. The rotation of mating face 24A eccentrically against stationary sealing face 65A removes any attempt at the accumulation of particles of dirt or refuse at the top or bottom edge of mating face 24A as it engages sealing face 65A. It has been found that under certain operating conditions and when annular mating face 24 is axially concentric, that a build up or accumulation of residue particles takes place.

Having shown and described preferred embodiments of the present invention by way of example, it should be realized that structural changes could be made and other examples given without departing from either the spirit or scope of this invention.

What I claim is:

1. A rotary mechanical fluid seal comprising a rotatable shaft, an expansible bellows, provided with a sleeve on one end and a cage on the other end, surrounding said shaft, means fastening said sleeve to said shaft, said cage having a circular groove and a resilient deformable lip, a rotary sealing ring having an axial bore surrounding said shaft, an annular mating face and a tongue provided with a tapered surface, said tongue engaging said circular groove with a press fit and with said resilient deformable lip yieldingly engaging said tapered surface to cooperate with said circular groove to removably retain said tongue therein, said annular mating face being axially concentric and adapted to engage a stationary sealing face under the influence of pressure exerted by said expansible bellows.

2. A rotary mechanical fluid seal comprising a rotatable shaft, a stationary sealing face, means supporting said stationary sealing face about said shaft, an expansible bellows, provided with a sleeve on one end and a cage on the other end, surrounding said shaft, a first means fastening said sleeve to said shaft, said cage having a circular groove, and a resilient deformable lip, a housing encircling said shaft and said bellows, a rotary sealing ring having an axial bore surrounding said shaft, an annular mating face, and a tongue provided with a tapered surface, said tongue engaging said circular groove with a press fit and with said resilient deformable lip yieldingly engaging said tapered surface to cooperate with said circular groove to removably retain said tongue therein, a second means between said rotary sealing ring and housing to rotate said rotary sealing ring with said housing a third means between said first means and housing to rotate said housing with said shaft, and resilient means interposed between said first means and housing to yieldingly urge said housing and annular mating face toward said stationary sealing face.

3. A rotary mechanical fluid seal comprising a rotatable shaft, an expansible bellows surrounding said shaft and provided with a sleeve on one end and a cage on the other end, a clamp ring means fastening said sleeve to said shaft, said cage having a generally U shaped circular groove facing axially, a resilient deformable lip and a pressure chamber, a rotary sealing ring having an axial bore surrounding said shaft, an annular mating face and a tongue provided with a cone type tapered surface, said tongue located within said U shaped circular groove with a press fit and with said resilient deformable lip yieldingly engaging said tapered surface to cooperate with said U shaped circular groove to removably retain said tongue therein, said annular mating face adapted to engage a stationary sealing face under the influence of the pressure exerted by said expansible bellows and pressure exerted by fluid in said pressure chamber and fluid pressure acting on said resilient deformable lip.

4. A rotary mechanical fluid seal comprising a rotatable shaft, an expansible bellows surrounding said shaft and provided with a sleeve on one end and a cage on the other end, a clamp ring fastening said sleeve to said shaft, said cage having a U shaped circular groove, and a resilient deformable lip, a rotary sealing ring having an axial bore surrounding said shaft, an annular mating face and a tongue provided with a cone type tapered surface, said tongue engaging said U shaped circular groove with said resilient deformable lip yieldingly engaging said tapered surface to cooperate with said U shaped circular groove to removably retain said tongue therein, a housing encircling said shaft, bellows and rotary sealing ring, resilient means interposed between said housing and clamp ring to yieldingly urge said annular mating face in a direction away from said clamp ring, means between said housing and said rotary sealing ring to rotate said rotary sealing ring with said housing and means between said housing and clamp ring to rotate said housing with said clamp ring and shaft, said annular mating face adapted to engage a stationary sealing face under the influence of said resilient means, and the pressure exerted by said expansible bellows and the fluid pressure exerted on the last convolution of the bellows adjacent said cage and the fluid pressure acting upon said resilient deformable lip and tapered surface, the pressure of the fluid also urging said tongue into mating engagement with U shaped circular groove.

5. A rotary mechanical seal comprising a rotatable shaft, an expansible bellows fabricated from tetrafluoroethylene surrounding said shaft and provided with a sleeve on one end and a cage on the other end, a clamp ring fastening said sleeve to said shaft, said cage having a generally U shaped circular groove and two adjaecnt circular steps, one step providing a resilient deformable lip, a rotary sealing ring having an axial bore surrounding said shaft, an annular mating face and a tongue provided with a cone type tapered surface, said tongue engaging said generally U shaped circular groove with said resilient deformable lip yieldingly engaging said cone type tapered surface to cooperate with said generally U shaped circular groove to removably retain said tongue within said cage, a housing encircling said shaft, bellows and rotary sealing ring, resilient means interposed between said housing and clamp ring, means between said housing and said rotary sealing ring to rotate said rotary sealing ring with said housing, and means between said housing and clamp ring to rotate said housing with said clamp ring and shaft, a retaining ring located in one of said steps to support said step against thermally produced distortion, said retaining ring providing a chamber in cooperation with said cone type tapered surface, a passageway to said chamber, said annular mating face adapted to engage a stationary sealing face under the influence of said resilient means, and the pressure exerted by said expansible bellows and the fluid pressure exerted upon the last convolution of the bellows adjacent said cage and the fluid pressure passing through said passageway into said chamber and acting upon said resilient deformable lip and cone type tapered surface.

6. A rotary mechanical seal comprising a rotatable shaft, an expansible bellows surrounding said shaft and provided with a sleeve on one end and a cage on the other end, a clamp ring fastening said sleeve to said shaft, said cage having a circular groove and two adjacent circular steps, one step providing a resilient deformable lip, a rotary sealing ring having an axial bore surrounding said shaft, an annular mating face and a tongue provided with a cone type tapered surface, said tongue engaging said circular groove with said resilient deformable lip yieldingly engaging said cone type tapered surface to cooperate with said circular groove to removably retain said tongue in said circular groove, a housing encircling said shaft, said bellows and said rotary sealing ring, resilient means interposed between said housing and clamp ring, means between said housing and said rotary sealing ring to rotate said rotary sealing ring with said housing, and means between said housing and clamping ring to rotate said housing with said clamp ring and shaft, a retaining ring located in the other of said two steps to support said step against sagging, said retaining ring providing a chamber in cooperation with said cone type tapered surface, a passageway to said chamber, a pressure chamber in said bellows, said annular mating face adapted to engage a stationary sealing face under the influence of said resilient means and the fluid pressure in said pressure chamber and the fluid pressure passing through said passageway to said chamber to act upon said resilient deformable lip engaging said cone type tapered surface.

7. A rotary mechanical fluid seal comprising a rotatable shaft, an expansible bellows having a sleeve on one end and a cage on the other end, said expansible bellows surrounding said shaft, means fastening said sleeve to said shaft, said cage having a circular groove, a resilient deformable lip and a step, a rotary sealing ring having an axial bore surrounding said shaft, an axially concentric annular mating face and a tongue provided with a cone type tapered surface, said tongue engaging said circular groove with said resilient deformable lip yieldingly engaging said cone type tapered surface to cooperate with said circular groove to removably retain said tongue in said circular groove, a retaining ring, means fastening said retaining ring in said step, said annular mating face adapted to engage a stationary sealing face.

8. A rotary mechanical fluid seal comprising a rotatable shaft, an expansible bellows, provided with a sleeve on one end and a cage on the other end, surrounding said shaft, means fastening said sleeve to said shaft, said cage having a circular groove and a resilient deformable lip, a rotary sealing ring having an axial bore surrounding said shaft, an annular mating face and a tongue provided with a tapered surface, said tongue engaging said circular groove with a press fit and with said resilient deformable lip yieldingly engaging said tapered surface to cooperate with said circular groove to removably retain said tongue therein, said annular mating face being axially eccentric, and adapted to engage a stationary sealing face under the influence of pressure exerted by said expansible bellows.

9. A rotary mechanical fluid seal comprising a rotatable shaft, an expansible bellows having a sleeve on one end and a cage on the other end, said expansible bellows surrounding said shaft, means fastening said sleeve to said shaft, said cage having a circular groove, a resilient deformable lip and a step, a rotary sealing ring having an axial bore surrounding said shaft, an axially eccentric annular mating face and a tongue provided with a cone type tapered surface, said tongue engaging said circular groove with a press fit and with said resilient deformable lip yieldingly engaging said cone type tapered surface to cooperate with said circular groove to removably retain said tongue in said circular groove, a retaining ring, means fastening said retaining ring in said step, said annular mating face adapted to engage a stationary sealing face.

References Cited

UNITED STATES PATENTS

| | | | |
|---|---|---|---|
| 2,758,856 | 8/1950 | Payne et al. | 277—87 |
| 3,194,569 | 7/1965 | Utvitch | 277—88 |

FOREIGN PATENTS

| | | |
|---|---|---|
| 735,250 | 8/1955 | Great Britain. |
| 847,720 | 9/1960 | Great Britain. |
| 963,356 | 7/1964 | Great Britain. |

SAMUEL ROTHBERG, *Primary Examiner.*